US012794246B2

(12) United States Patent
Ono et al.

(10) Patent No.: US 12,794,246 B2
(45) Date of Patent: Nov. 10, 2026

(54) STORAGE BATTERY CONTROL DEVICE, POWER STORAGE SYSTEM, AND STORAGE BATTERY CONTROL METHOD

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

(*) Notice: Subject to any disclaimer, the term of this patent is extended or adjusted under 35 U.S.C. 154(b) by 808 days.

(21) Appl. No.: 18/317,060

(22) Filed: May 13, 2023

(65) Prior Publication Data

US 2023/0396079 A1 Dec. 7, 2023

(30) Foreign Application Priority Data

Jun. 6, 2022 (JP) ................................ 2022-091339

(51) Int. Cl.

*H02J 7/54* (2026.01)
*H01M 10/44* (2006.01)
*H02J 7/60* (2026.01)
*H02J 7/94* (2026.01)

(52) U.S. Cl.

CPC ............ *H02J 7/54* (2026.01); *H01M 10/441* (2013.01); *H02J 7/667* (2026.01); *H02J 7/947* (2026.01)

(58) Field of Classification Search

CPC .............. H02J 7/54; H02J 7/947; H02J 7/667
See application file for complete search history.

(56) References Cited

U.S. PATENT DOCUMENTS

2016/0134160 A1* 5/2016 Schultz .................... H02J 7/56 307/77
2023/0032370 A1* 2/2023 Ono .......................... H02J 7/54

FOREIGN PATENT DOCUMENTS

JP 2013-31247 A 2/2013
JP 2013-31249 A 2/2013

* cited by examiner

*Primary Examiner* — Robert Grant
(74) *Attorney, Agent, or Firm* — KENEALY VAIDYA LLP

(57) ABSTRACT

A storage battery control device constructed of a controller and a driver is provided so as to control a power storage system. The power storage system has storage battery strings including a plurality of power storage batteries connected in series and bypass circuits, power converters configured to convert input and output voltages of the storage battery strings, and a string switch configured to connect or disconnect the storage battery strings and the power converters. The string switch is brought into a disconnected state by the storage battery control device before execution of a bypass operation by the bypass circuits, and is brought into a connected state by the storage battery control device after the execution of the bypass operation by the bypass circuit.

5 Claims, 2 Drawing Sheets

STORAGE BATTERY CONTROL DEVICE, POWER STORAGE SYSTEM, AND STORAGE BATTERY CONTROL METHOD

CROSS-REFERENCE TO RELATED APPLICATIONS

This application is based on and claims priority under 35 USC 119 from Japanese Patent Application No. 2022-091339 filed on Jun. 6, 2022, the contents of which are incorporated herein by reference.

TECHNICAL FIELD

The present invention relates to a storage battery control device, a power storage system, and a storage battery control method.

BACKGROUND ART

As a system that controls discharge of a power storage system including a plurality of power storage batteries connected in series, there is known a system in which a storage battery that cannot discharge a required current is bypassed and the current is discharged from another storage battery (for example, see Patent Literature 1). In addition, as a system that controls charge of a power storage system including a plurality of power storage batteries connected in series, there is known a system in which a storage battery that cannot be charged with an input current is bypassed and another storage battery is charged (for example, see Patent Literature 2). The power storage systems described in Patent Literatures 1 and 2 each include a first switch that connects or disconnects a power storage battery and a second switch that connects or disconnects a bypass line.

CITATION LIST

Patent Literature

Patent Literature 1: JP2013-31247A
Patent Literature 2: JP2013-31249A

SUMMARY OF INVENTION

In the power storage systems described in Patent Literatures 1 and 2, the first switch is first switched from a connected state to a disconnected state and then the second switch is switched from the disconnected state to the connected state to prevent a short circuit when a storage battery is bypassed. When the bypass state of the storage battery is released, to prevent a short circuit, the second switch is first switched from the connected state to the disconnected state, and then the first switch is switched from the disconnected state to the connected state.

Here, when a storage battery string including a plurality of power storage batteries is connected to a power converter and a storage battery is bypassed, a total voltage of the power storage batteries in the connected state immediately before the bypass is applied to the first switch in the disconnected state through the power converter. At this time, a voltage obtained by subtracting a voltage of the storage battery to be bypassed from the total voltage of the storage batteries in the connected state immediately before the bypass is applied to the second switch in the disconnected state through the power converter. When the bypass state of the storage battery is released, a voltage obtained by adding a voltage of the storage battery released from the bypass state to a total voltage of the storage batteries in the connected state immediately before the bypass state is released is applied to the first switch in the disconnected state through the power converter. At this time, the total voltage of the storage batteries in the connected state immediately before the bypass state is released is applied to the second switch in the disconnected state through the power converter. For this reason, it is necessary to use high-cost switches coping with a high voltage and a large current as the first switch and the second switch. Accordingly, when the storage battery string is constituted by plural power storage batteries, the cost of the first switch and the second switch is amplified and large.

In view of the above circumstance, an object of the present invention is to provide a storage battery control device, a power storage system, and a storage battery control method that can reduce the cost of a bypass circuit, which bypasses a storage battery, of a power storage system including a power converter and a storage battery string including the bypass circuit.

A storage battery control device of the present disclosure controls a power storage system including a storage battery string having a plurality of storage batteries connected in series and a bypass circuit configured to execute a bypass operation of bypassing the storage battery or releasing a bypass state of the storage battery, a power converter connected to both ends of the storage battery string and configured to convert an input and output voltage of the storage battery string, and a string switch provided between the storage battery string and the power converter and configured to connect or disconnect the storage battery string and the power converter. The string switch is brought into a disconnected state by the storage battery control device before execution of the bypass operation by the bypass circuit, and the string switch is brought into a connected state by the storage battery control device after the execution of the bypass operation by the bypass circuit.

A power storage system of the present disclosure includes a storage battery string including a plurality of storage batteries connected in series and a bypass circuit configured to execute a bypass operation of bypassing the storage battery or releasing a bypass state of the storage battery, a power converter connected to both ends of the storage battery string and configured to convert an input and output voltage of the storage battery string, a string switch provided between the storage battery string and the power converter and configured to connect or disconnect the storage battery string and the power converter, and a storage battery control device configured to control the string switch and the bypass circuit. The storage battery control device brings the string switch into a disconnected state before execution of the bypass operation by the bypass circuit, and brings the string switch into a connected state after the execution of the bypass operation by the bypass circuit.

A storage battery control method of the present disclosure is implemented by a storage battery control device that controls a power storage system. The power storage system includes a storage battery string including a plurality of storage batteries connected in series and a bypass circuit configured to execute a bypass operation of bypassing the storage battery or releasing a bypass state of the storage battery, a power converter connected to both ends of the storage battery string and configured to convert an input and output voltage of the storage battery string, and a string switch provided between the storage battery string and the power converter and configured to connect or disconnect the storage battery string and the power converter. The string switch is brought into a disconnected state before execution of the bypass operation by the bypass circuit, and the string switch is brought into a connected state after the execution of the bypass operation by the bypass circuit.

According to the present invention, it is possible to reduce the cost of a bypass circuit, which bypasses a storage battery, of a power storage system including a power converter and a storage battery string including the bypass circuit.

DESCRIPTION OF EMBODIMENTS

Figure 1:
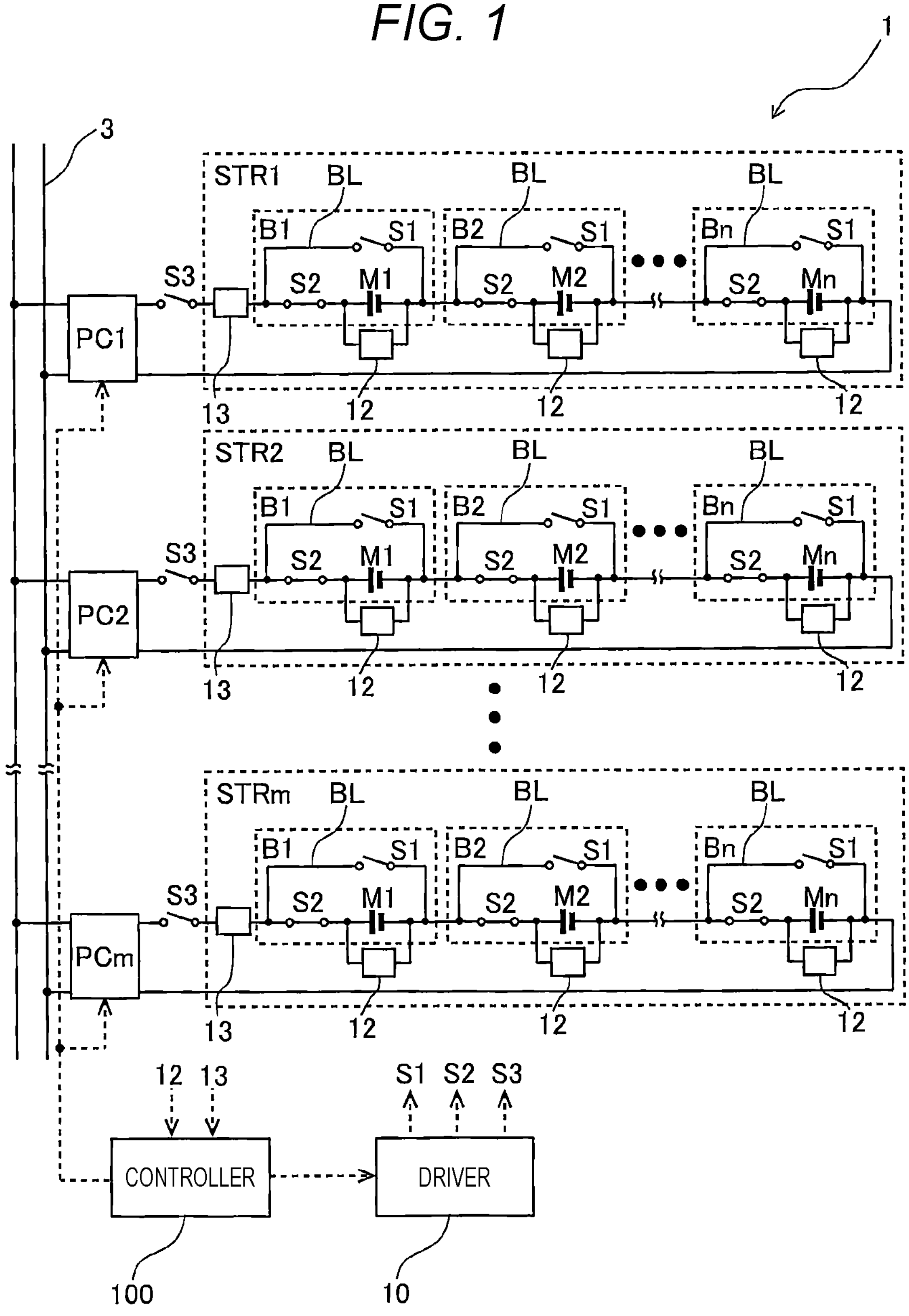
FIG. 1 is a schematic circuit diagram showing a power storage system including a controller and a driver according to an embodiment of the present invention.

Hereinafter, the present invention will be described with reference to a preferred embodiment. The present invention is not limited to the embodiment described below, and the embodiment can be appropriately modified without departing from the gist of the present invention. In the following described embodiment, a part of configurations may be not described or shown in the drawings, and regarding details of the omitted techniques, publicly known or well-known techniques are appropriately applied as long as there is no contradiction with contents described below.

FIG. 1 is a schematic circuit diagram showing a power storage system 1 including a controller 100 and a driver 10 as storage battery control devices according to an embodiment of the present invention. As shown in this drawing, the power storage system 1 includes m (m is an integer of 1 or more) storage battery strings STR1 to STRm, a string bus 3, m power converters PC1 to PCm, the driver 10, and the controller 100. The m sets of storage battery strings STR1 to STRm are connected to each other via the m power converters PC1 to PCm and the string bus 3, and are connected to an external system (not shown). The power storage system 1 is a stationary or in-vehicle power supply.

The storage battery strings STR1 to STRm each include n (n is an integer of 2 or more) storage battery modules M1 to Mn connected in series. Although not particularly limited, the storage battery strings STR1 to STRm according to the present embodiment are obtained by regenerating used storage batteries, and a deterioration degree differs among the storage battery modules M1 to Mn. The storage battery modules M1 to Mn are secondary batteries such as lithium ion batteries and lithium ion capacitors. In the following description, the storage battery strings STR1 to STRm are referred to as storage battery strings STR when it is not necessary to distinguish them from each other. In the following description, the storage battery modules M1 to Mn are referred to as storage battery modules M when it is not necessary to distinguish them from each other. Further, in the following description, the power converters PC1 to PCm are referred to as power converters PC when it is not necessary to distinguish them from each other.

The storage battery module M is charged by being supplied with power from the external system through the string bus 3 and the power converter PC, and discharges the charged power through the power converter PC and the string bus 3 to supply power to the external system. The storage battery module M may be charged by being supplied with power from another storage battery string STR through the string bus 3 and the power converter PC. The storage battery module M may discharge the charged power and charge the storage battery module M of another storage battery string STR through the power converter PC and the string bus 3.

The external system includes a load, a generator, and the like. When the power storage system 1 is a stationary power storage system, home appliances, commercial power supply systems, liquid crystal displays, communication modules and the like serve as loads, and a solar photovoltaic power generation system or the like serves as a generator. On the other hand, when the power storage system 1 is an in-vehicle power storage system, a driving motor, an air conditioner, various in-vehicle electrical components and the like serve as loads. The driving motor serves as a load and a generator.

The storage battery string STR may include n storage battery cells or storage battery packs connected in series instead of the n storage battery modules M connected in series. The power storage system 1 may further include bypass circuits B1 to Bn that bypass the respective storage battery cells or the respective storage battery packs.

The power converter PC is a DC/DC converter or a DC/AC converter, and is connected to the string bus 3. The power converter PC is connected to a positive electrode of the storage battery module M1 at a start and a negative electrode of the storage battery module Mn at an end.

When the storage battery string STR is charged, the power converter PC converts a voltage received from the string bus 3 and outputs the converted voltage to the plurality of storage battery modules M. On the other hand, when the storage battery string STR is discharged, the power converter PC converts voltages received from the plurality of storage battery modules M and outputs the converted voltages to the string bus 3. When a current flowing through the string bus 3 is a direct current, the power converter PC is a DC/DC converter, and when the current flowing through the string bus 3 is an alternating current, the power converter PC is a DC/AC converter. When the current flowing through the string bus 3 is the alternating current, the power converter PC includes a synchronization unit that follows a change in an instantaneous value.

The storage battery strings STR1 to STRm each include n voltage sensors 12, a current sensor 13, and n bypass circuits B1 to Bn. The voltage sensor 12 is connected between positive and negative electrode terminals of the respective storage battery module M. The voltage sensor 12 measures a voltage between the terminals of the storage battery module M. The current sensor 13 is provided in a current path of the storage battery string STR. The current sensor 13 measures a charge and discharge current of the storage battery string STR. The storage battery string STR may include a temperature sensor or the like that measures the temperature of the storage battery module M or the storage battery string STR.

The bypass circuits B1 to Bn are provided for respective storage battery modules M. The bypass circuits B1 to Bn each include a bypass line BL, a bypass switch S1, and a module switch S2. The bypass line BL is a power line that bypasses the storage battery module M. The bypass switch S1 is provided on the bypass line BL. The bypass switch S1 is, for example, a mechanical switch. The module switch S2 is provided between the positive electrode of the storage battery module M and one end of the bypass line BL. The module switch S2 is, for example, a semiconductor switch or a relay. In the following description, the bypass circuits B1 to Bn are referred to as bypass circuits B when it is not necessary to distinguish them from each other.

The storage battery module M1 at the start and the storage battery module Mn at the end are connected to the external system via the power converter PC and the string bus 3. When the bypass switch S1 is opened and the module switch S2 is closed in all the bypass circuits B, all the storage battery modules M are connected in series to the external system. On the other hand, when the module switch S2 is opened and the bypass switch S1 is closed in any one of the bypass circuits B, the storage battery module M corresponding to the bypass circuit B is bypassed.

The controller 100 is connected to the power converter PC and the driver 10, and executes monitoring and control for the storage battery module M, switching control for the bypass circuit B, and charge and discharge control of the power converter PC. The controller 100 further executes switching control of a string switch S3 described later. ON/OFF control of the bypass switch S1 and the module switch S2 of the bypass circuit B is executed by the driver 10 according to a control signal from the controller 100. ON/OFF control of the string switch S3 is executed by the driver 10 according to a control signal from the controller 100.

When the power storage system 1 is discharged, voltages of the storage battery strings STR fluctuate according to state of charges (SOCs) or bypass states (the number of connected storage battery modules M) of the storage battery modules M. For this reason, the power converters PC adjust output voltages such that the voltages of the storage battery strings STR to be discharged match. On the other hand, when the power storage system 1 is charged, voltages of the storage battery strings STR fluctuate according to the SOCs or the bypass states of the storage battery modules M. For this reason, the power converters PC adjust a voltage received from the string bus 3 to the voltages of the respective storage battery strings STR. That is, the controller 100 controls the power converters PC according to magnitude of the voltages of the respective storage battery strings STR.

Here, the string switch S3 is provided between each storage battery string STR and the respective power converter PC. The string switch S3 connects or disconnects the storage battery string STR and the respective power converter PC. The string switch S3 is, for example, a mechanical switch, a semiconductor switch, or a relay.

A rated voltage of the string switch S3 is set to be equal to or higher than a total voltage of the storage battery string STR. That is, the string switch S3 is a switch having electric resistance to the total voltage of all the storage battery modules M included in the storage battery string STR. In contrast, rated voltages of the bypass switch S1 and the module switch S2 are set to be less than the total voltage of the storage battery string STR, and are, for example, 1/n or more (n is the number of storage battery modules M) and ½ or less of the total voltage of the storage battery string STR.

The controller 100 determines whether to bypass the storage battery module M based on the SOC, the voltage and the like of the storage battery module M included in the storage battery string STR. When determined necessary to bypass the storage battery module M, the controller 100 transmits, to the power converter PC corresponding to the storage battery string STR including the storage battery module M, a control signal for controlling a charge and discharge current of the power converter PC. When determined necessary to bypass the storage battery module M, the controller 100 further transmits a control signal for controlling ON/OFF of the bypass switch S1, the module switch S2, and the string switch S3 to the driver 10.

On the other hand, the controller 100 determines whether it is necessary to release the bypass of the storage battery module M in the bypass state based on the SOC, the voltage and the like of the storage battery module M included in the storage battery string STR. When determined necessary to release the bypass of the storage battery module M in the bypass state, the controller 100 transmits, to the power converter PC corresponding to the storage battery string STR including the storage battery module M, the control signal for controlling the charge and discharge current of to the power converter PC. When determined necessary to release the bypass of the storage battery module M, the controller 100 further transmits the control signal for controlling ON/OFF of the bypass switch S1, the module switch S2, and the string switch S3 to the driver 10.

Hereinafter, processing of the controller 100 and the driver 10 when the bypass circuit B executes a bypass operation of bypassing the storage battery module M or releasing the bypass state of the storage battery module M will be described.

Figure 2:
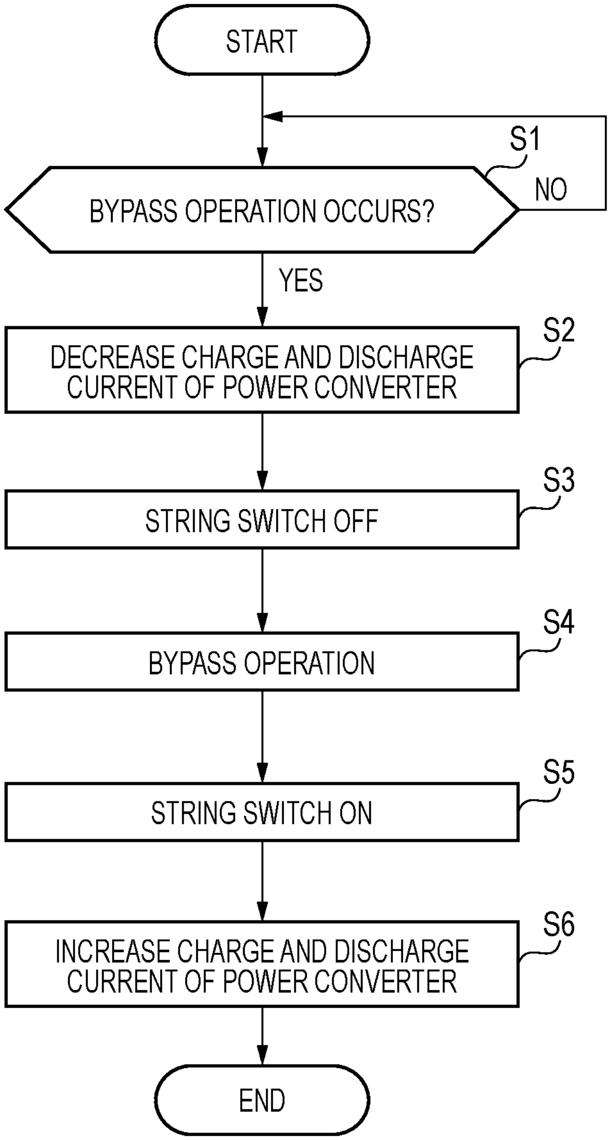
FIG. 2 is a flowchart showing processing of the controller and the driver when a bypass circuit performs a bypass operation.

FIG. 2 is a flowchart showing the processing of the controller 100 and the driver 10 when the bypass circuit B executes the bypass operation. As shown in the flowchart, in step S1, the controller 100 determines whether the bypass operation of the bypass circuit B occurs. Step S1 is repeated until an affirmative determination is made in step S1, and the process proceeds to step S2 when the affirmative determination is made in step S1.

In step S2, the controller 100 controls the power converter PC corresponding to the storage battery string STR in which the bypass operation of the bypass circuit B occurs, and decreases a charge current or a discharge current of the power converter PC to a predetermined value A1. Here, the predetermined value A1 is a current value of a minute current that can prevent generation of an arc when the string switch S3 is switched from ON to OFF.

Next, in step S3, the controller 100 transmits, to the driver 10, the control signal for switching the string switch S3 corresponding to the storage battery string STR in which the bypass operation occurs from ON to OFF. The driver 10 switches the corresponding string switch S3 from ON to OFF according to the control signal transmitted from the controller 100.

Next, in step S4, the controller 100 transmits, to the driver 10, a control signal for the corresponding bypass circuit B to perform the bypass operation. In the case of the bypass operation of switching the storage battery module M from the connected state to the bypass state, the driver 10 first switches the module switch S2 from ON to OFF, and then switches the bypass switch S1 from OFF to ON. In contrast, in the case of the bypass operation of switching the storage battery module M from the bypass state to the connected state, the driver 10 first switches the bypass switch S1 from ON to OFF, and then switches the module switch S2 from OFF to ON.

Next, in step S5, the controller 100 transmits to the driver 10 the control signal for switching the string switch S3 corresponding to the storage battery string STR in which the bypass circuit B executed the bypass operation from OFF to ON. The driver 10 switches the corresponding string switch S3 from OFF to ON according to the control signal transmitted from the controller 100.

Next, in step S6, the controller 100 controls the power converter PC corresponding to the storage battery string STR in which the bypass circuit B executed the bypass operation, and increases the charge current or the discharge current of the power converter PC from the predetermined value A1 as necessary. This completes the process.

Here, a case in which the bypass operation of bypassing the storage battery module M is executed and the module switch S2 is switched from ON to OFF (the bypass switch S1 is OFF) in a state where the string switch S3 is connected will be discussed. In this case, the total voltage of the storage battery modules M (maximum total voltage of the storage battery string STR) in the connected state immediately before the bypass is applied to the module switch S2. In addition, a voltage obtained by subtracting the voltage of the storage battery module M to be bypassed from the total voltage of the storage battery modules M in the connected state immediately before the bypass is applied to the bypass switch S1 in the disconnected state. For this reason, it is necessary to set the rated voltages of the bypass switch S1 and the module switch S2 to be equal to or higher than the total voltage of the storage battery string STR.

In addition, a case in which an operation of releasing the bypass of the storage battery module M is executed and the bypass switch S1 is switched from ON to OFF (the module switch S2 is OFF) in the state where the string switch S3 is connected will be discussed. In this case, the total voltage of the storage battery modules M in the connected state immediately before the bypass state is released is applied to the bypass switch S1. In addition, a voltage obtained by adding the voltage of the storage battery module M released from the bypass state to the total voltage of the storage battery modules M in the connected state immediately before the bypass state is released is applied to the module switch S2 in the disconnected state. For this reason, it is necessary to set the rated voltages of the bypass switch S1 and the module switch S2 to be equal to or higher than the total voltage of the storage battery string STR.

In contrast, the controller 100 and the driver 10 according to the present embodiment bring the string switch S3 to the disconnected state before the execution of the bypass operation in which the bypass circuit B bypasses the storage battery module M. The controller 100 and the driver 10 bring the string switch S3 into the connected state after the bypass circuit B executed the bypass operation of bypassing the storage battery module M. Accordingly, in the bypass operation of bypassing the storage battery module M, no voltage is applied to the module switch S2 when the module switch S2 is switched from ON to OFF (the bypass switch S1 is OFF).

In addition, the controller 100 and the driver 10 according to the present embodiment bring the string switch S3 to the disconnected state before the execution of the bypass operation in which the bypass circuit B releases the bypass state of the storage battery module M. The controller 100 and the driver 10 bring the string switch S3 into the connected state after the bypass circuit B executed the bypass operation of releasing the bypass state of the storage battery module M. Accordingly, in the bypass operation for releasing the bypass state of the storage battery module M, no voltage is applied to the bypass switch S1 and the module switch S2 when the bypass switch S1 is switched from ON to OFF (the module switch S2 is OFF).

For this reason, it is not necessary to use high-cost switches and relays coping with a high voltage and a large current as the module switch S2 and the bypass switch S1. Accordingly, it is possible to provide the string switch S3 having a withstand voltage that can cope with the total voltage of the storage battery string STR and use the module switch S2 and the bypass switch S1 having a relatively low withstand voltage. Accordingly, even when the storage battery string STR includes plural storage battery modules M, it is possible to prevent an increase in the cost of the module switch S2 and the bypass switch S1 and reduce the total cost of the power storage system 1. In addition, it is possible to obtain an effect of downsizing the module switch S2 and the bypass switch S1.

In addition, the controller 100 and the driver 10 according to the present embodiment decrease the charge current or the discharge current of the power converter PC to the predetermined value A1 before the string switch S3 is brought into the disconnected state. After the string switch S3 is brought into the connected state, the controller 100 and the driver 10 increase the charge current or the discharge current of the power converter PC as necessary. Accordingly, it is possible to prevent an arc between terminals of the string switch S3 when the string switch S3 is disconnected.

In the power storage system 1 according to the present embodiment, the rated voltage of the string switch S3 is set to be equal to or higher than the total voltage of the storage battery string STR, and the rated voltages of the module switch S2 and the bypass switch S1 are set to be lower than the total voltage of the storage battery string STR. Accordingly, it is possible to reduce the total cost of the power storage system 1 and implement safe operation of the power storage system 1.

Although the present invention is described above based on the above-described embodiment, the present invention is not limited to the above-described embodiment, modifications may be made without departing from the gist of the present invention, and publicly known or well-known techniques may be appropriately combined.

For example, in the above-described embodiment, the string switch S3 is provided between the storage battery module M1 at the start and the power converter PC. Alternatively, the string switch S3 may be provided between the storage battery module Mn at the end and the power converter PC.

What is claimed is:

1. A storage battery control device that controls a power storage system, the system comprising:

a storage battery string including a plurality of storage batteries connected in series and a bypass circuit configured to execute a bypass operation of bypassing the storage battery or releasing a bypass state of the storage battery;

a power converter connected to both ends of the storage battery string and configured to convert an input and output voltage of the storage battery string; and a string switch provided between the storage battery string and the power converter and configured to connect or disconnect the storage battery string and the power converter, wherein the string switch is brought into a disconnected state by the storage battery control device before execution of the bypass operation by the bypass circuit, and the string switch is brought into a connected state by the storage battery control device after the execution of the bypass operation by the bypass circuit.

2. The storage battery control device according to claim 1, wherein a charge current or a discharge current of the power converter is decreased by the storage battery control device before the string switch is brought into the disconnected state, and the charge current or the discharge current of the power converter is increased by the storage battery control device after the string switch is brought into the connected state.

3. A power storage system comprising:

a storage battery string including a plurality of storage batteries connected in series and a bypass circuit configured to execute a bypass operation of bypassing the storage battery or releasing a bypass state of the storage battery;

a power converter connected to both ends of the storage battery string and configured to convert an input and output voltage of the storage battery string;

a string switch provided between the storage battery string and the power converter and configured to connect or disconnect the storage battery string and the power converter; and a storage battery control device configured to control the string switch and the bypass circuit, wherein the storage battery control device brings the string switch into a disconnected state before execution of the bypass operation by the bypass circuit, and brings the string switch into a connected state after the execution of the bypass operation by the bypass circuit.

4. The power storage system according to claim 3, wherein the bypass circuit includes a storage battery switch configured to connect or disconnect the storage battery to or from the storage battery string, a bypass line configured to bypass the storage battery switch and the storage battery, and a bypass switch provided on the bypass line and configured to connect or disconnect the bypass line, a rated voltage of the string switch is set to be equal to or higher than a total voltage of the storage battery string, and a rated voltage of the storage battery switch and a rated voltage of the bypass switch are set to be less than the total voltage of the storage battery string.

5. A storage battery control method implemented by a storage battery control device that controls a power storage system, the power storage system comprising:

a storage battery string including a plurality of storage batteries connected in series and a bypass circuit configured to execute a bypass operation of bypassing the storage battery or releasing a bypass state of the storage battery;

a power converter connected to both ends of the storage battery string and configured to convert an input and output voltage of the storage battery string; and a string switch provided between the storage battery string and the power converter and configured to connect or disconnect the storage battery string and the power converter, wherein the string switch is brought into a disconnected state before execution of the bypass operation by the bypass circuit, and the string switch is brought into a connected state after the execution of the bypass operation by the bypass circuit.

* * * * *